UNITED STATES PATENT OFFICE.

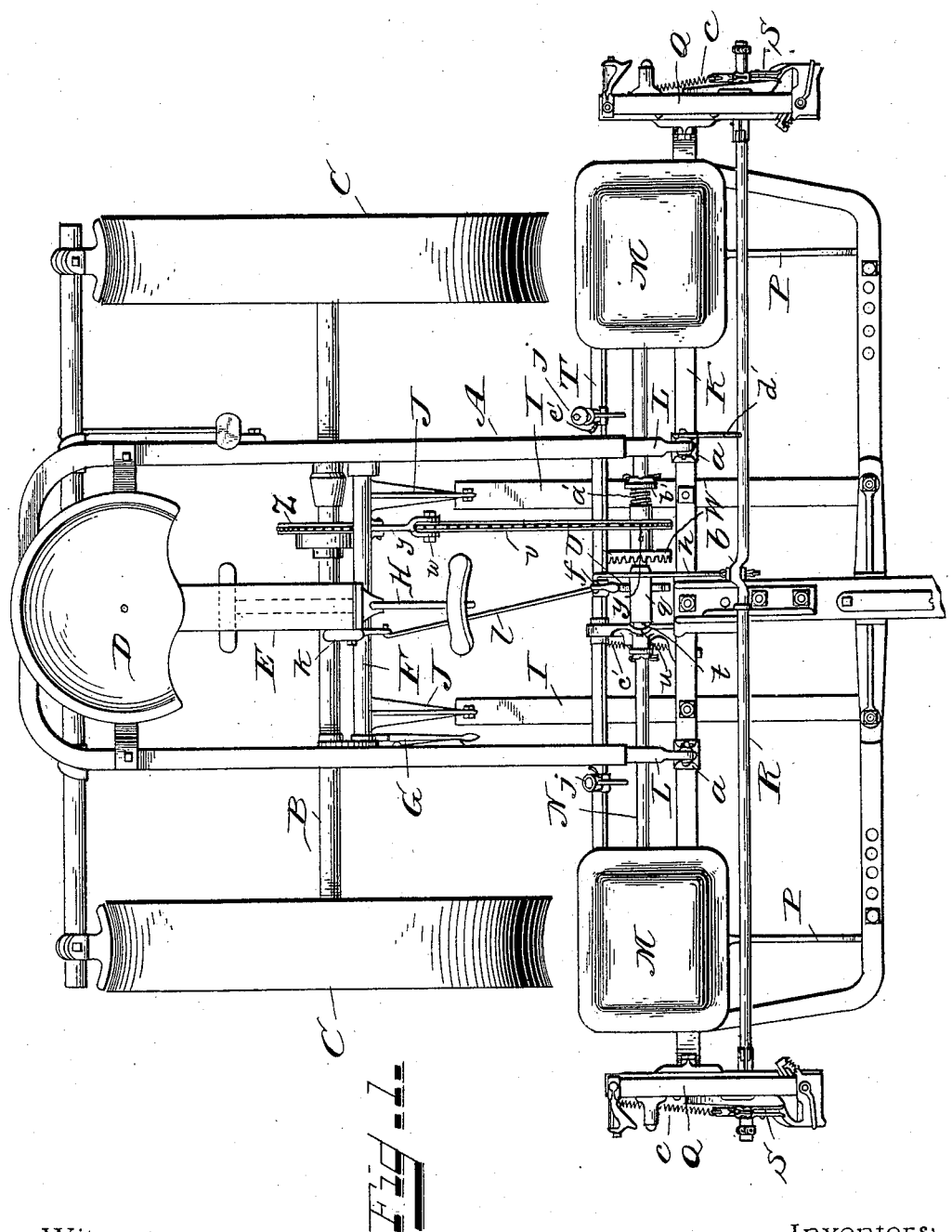

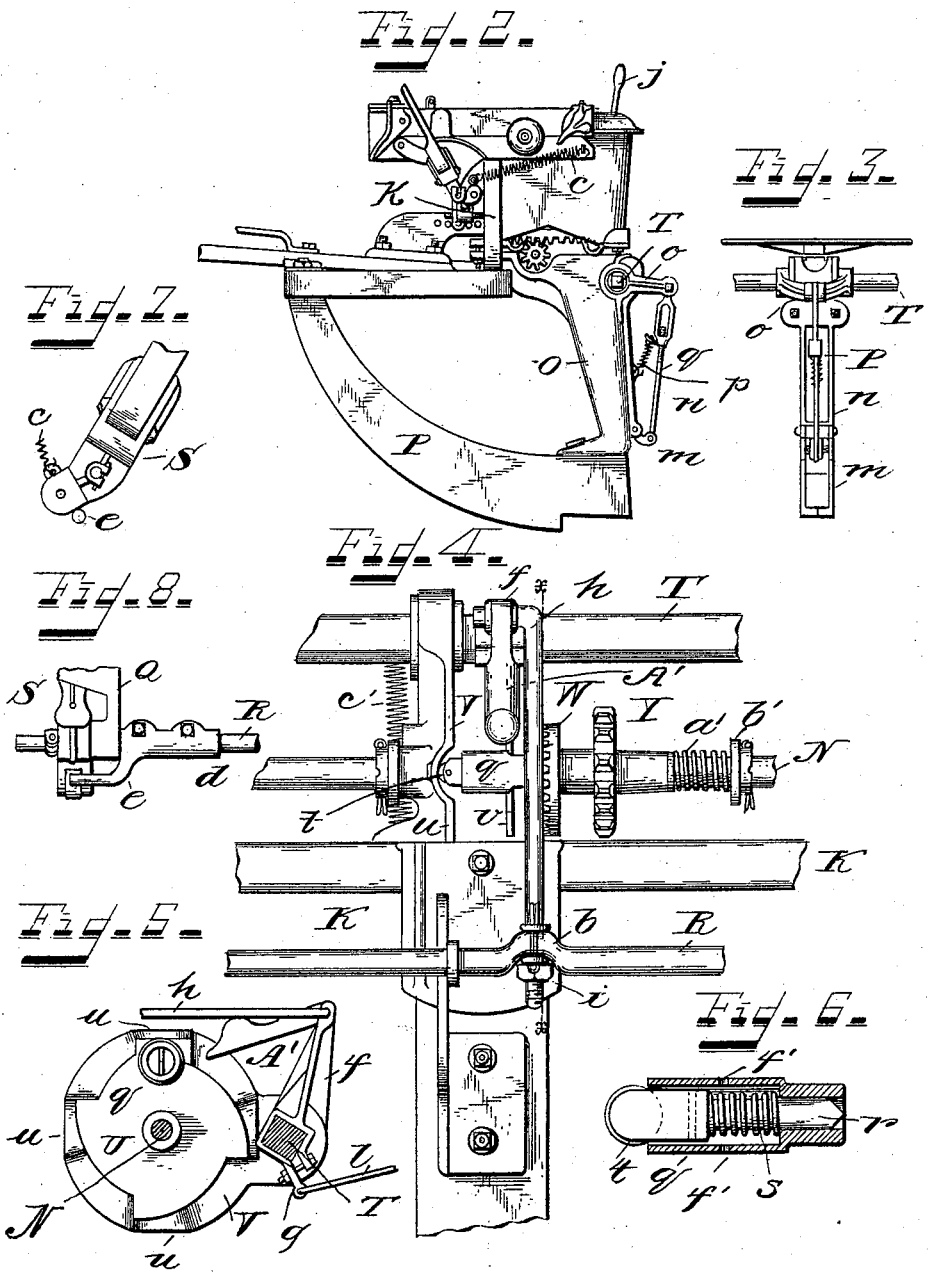

ARTHUR F. BROWN AND CLEMENT W. MICHAEL, OF DAYTON, OHIO, ASSIGNORS TO THE STODDARD MANUFACTURING COMPANY, OF SAME PLACE.

CORN-PLANTER.

SPECIFICATION forming part of Letters Patent No. 578,074, dated March 2, 1897.

Application filed July 5, 1895. Serial No. 555,037. (No model.)

*To all whom it may concern:*

Be it known that we, ARTHUR F. BROWN and CLEMENT W. MICHAEL, citizens of the United States, residing at Dayton, in the county of Montgomery and State of Ohio, have invented certain new and useful Improvements in Corn-Planters, of which the following is a full, clear, and exact description, reference being had to the accompanying drawings, forming part of this specification.

Our invention relates to that class of corn-planters having a main wheel-frame to which is hinged or jointed a forward runner and seed frame, and has for its object the provision of means whereby the traction of the machine is applied rotatively to the seed-shaft at such intervals as are desired, either by automatic check-row mechanism from one point, by hand mechanism from another point, or by the foot of the driver of the machine from another point; also in the provision of means whereby the feed-shaft may be continuously rotated by the traction of the machine and whereby the planter may be used as a drill, a drill-dropper, or a hill-dropper, according to the preference of the operator.

The novelty of our invention will be hereinafter set forth, and specifically pointed out in the claims.

In the accompanying drawings, Figure 1, Sheet 1, is a plan view of a corn-planter embodying our invention. Fig. 2, Sheet 2, is a side elevation of the runner-frame. Fig. 3, Sheet 2, is a rear elevation of one of the runner-shanks and its valve mechanism. Fig. 4, Sheet 2, is an enlarged detail plan view of the mechanism for connecting and disconnecting the seed-shaft from the driving mechanism. Fig. 5, Sheet 2, is a sectional side elevation on the dotted line $xx$ of Fig. 4, looking to the left. Fig. 6, Sheet 2, is an enlarged sectional plan through the dog or lock housing. Fig. 7, Sheet 2, is an enlarged detail end elevation of the check-row fork. Fig. 8, Sheet 2, is a front view of the same, showing the connection of the forward rock-shaft.

The same letters of reference are used to indicate identical parts in all the figures.

In Fig. 1, A is the main frame, to which is journaled the axle B, carried and revolved by the mounted wheels C. D is the driver's seat, whose bow E is carried on the transverse rock-shaft F, journaled upon the main frame A, and which is actuated by a hand lock-lever G, or by a foot-lever H, to raise or depress the runners or runner-frame, whose hounds I are pivotally connected to arm J, extending from the rock-shaft F. All these parts may be of the usual or any suitable construction, and being well known need not be further described.

The main frame is coupled by hinged joints to the runner-frame through means of curved arms L, projecting from the forward ends of the main frame A and bent downward with perforated ends pivoted between lugs $a$ on the runner-frame. The runner-frame carries the usual or any suitable hoppers M for the corn, provided with the usual or any suitable dropping-plates, actuated by a shaft N, carried thereby, and suitably connected under the hoppers. The dropping-plates communicate with the shanks or spouts O, carried on the rear of the runners P.

The check-row heads Q are secured upon upturned ends of the bar K of the runner-frame and have journaled through them a rock-shaft R, having a crank or its equivalent $b$ at or near its middle. The check-row forks S, Figs. 7 and 8, are loosely journaled upon the projecting ends of the shaft R and are held normally projected forward by coiled springs $c$, secured to their lower ends and to fixed parts of the head, as seen in Fig. 2. Sleeves $d$, Fig. 8, fast on the shaft R, on the inner sides of the heads Q, have crank-arms $e$ bearing against the lower projecting ends of the forks S, as seen in Figs. 7 and 8. It results from this construction that when the forks are pressed back by the action of the check-row wire in the usual manner the shaft R will be rocked backward. Through other instrumentalities, to be presently described, the shaft R may be similarly rocked without imparting motion to the fork-arms.

Suitably journaled at the rear of the upper ends of the shanks, and preferably through the same, as shown, is a second rock-shaft T, Figs. 1, 2, and 3, having fast thereon in line with the crank $b$ an upwardly-projecting arm $f$, Figs. 1, 4, and 5, and a downwardly-projecting arm $g$. The arm $f$ is connected by a pivoted link $h$ with the crank $b$ or its equivalent on the shaft R, an adjustable stirrup on the threaded end of the link serving to connect it to the crank. From this construction it will be seen that the two rock-shafts are coupled so that whenever one is rocked a like motion is imparted to the other.

The shaft T may be primarily rocked by a handpiece $j$, Figs. 1 and 2, from the usual dropper's seat (not shown) or by a foot-treadle $k$, Fig. 1, pivoted to the main frame, in this instance to the seat-bow, and connected to the arm $g$ by a link $l$, so that the driver on his seat D may with his foot rock the shaft T.

Valves $m$, Figs. 2 and 3, are pivoted in the lower ends of the spouts O to normally close the same and carry projecting lugs, to which are pivoted the lower ends of links $n$, whose upper ends are pivoted to crank-arms $o$, fast on the shaft T and preferably straddling the shank, as shown. The links $n$ are in two parts connected by a turnbuckle for the purpose of adjusting the valves. The springs $p$, connected thereto and to the shanks, serve to normally hold the valves closed.

Fast on the feed-shaft N is a ratchet-disk U, with, in this instance, four teeth and carrying a transversely-set housing $q$, Figs. 1, 4, and 6, in which is confined and guided a dog or lock-bolt $r$, normally held projected toward a fixed flat disk V, carried by bar K, by a coiled spring $s$, and which projecting end is forked and has pivoted therein a roller $t$, bearing against said disk and normally in one of a series of equidistant depressions $u$ in the face of the disk corresponding with the number of teeth of the ratchet U. Adjacent to the ratchet U and loose on the shaft N is a crown-gear W, carrying on its hub a sprocket-wheel Y, constantly driven by the traction of the machine forward, in this instance from a sprocket-wheel Z on the axle B, and a connecting drive-chain $v$, held permanently taut by an idler-sprocket $w$, pivoted to an arm $y$, which is pivoted to the shaft F, Fig. 1. The sprocket Y and gear W are held constantly toward the ratchet U by a spring $a'$, coiled around the shaft N and bearing against the hub of the sprocket Y, and a washer $b'$, fast on the shaft N, as seen in Fig. 4.

A dog A', Figs. 4 and 5, is pivoted to the arm $f$ and engages the shoulders or teeth of the ratchet U, and to aid the spring $p$ in the quick closing of the valves $m$ in the spouts and the resetting of the shaft T and connected parts we employ a coiled spring $c'$, Figs. 1 and 4, secured to pendent arms on the shaft T and bar K, respectively. The nose of the dog or bolt $r$ is in line with the teeth of the gear W, so that whenever the ratchet U is given a partial turn forward the roller $t$ in travelling up out of the depression $u$ forces the nose of the dog into engagement with the teeth of the gear W and locks the same and the sprocket Y to the shaft N, and the latter is driven forward by the traction of the machine to actuate the dropping mechanism until the roller, coming opposite the next depression $u$ in its forward path of travel, is forced therein by the spring $s$, which retracts the bolt and breaks the connection between the constantly-revolving gear W and the shaft N, which again comes to rest.

It will be seen from the foregoing description that whenever the shaft T is rocked forward, whether by the foot of the driver or by hand from the dropper's seat or by the check-row wire through shaft R and link $h$, it immediately opens the valves $m$ to let out the corn deposited thereon by the last action of the seed-dropping mechanism and then closes the same at once before the seed-dropping mechanism can deposit fresh charges in the spouts. This rocking of the shaft T through the medium of the dog A' turns the ratchet U far enough to force the roller $t$ out of one depression $u$ and to project the dog $r$ into engagement with the gear W, so that the feed-shaft will begin to turn to actuate the dropping mechanism to deposit the next charge in the spouts, and this action continues until the roller $t$ comes opposite the next depression $u$, when the lock will be broken, as above described, and the feed-shaft will come to rest again and remain so until the shaft T is again rocked, and so on, as will be readily understood.

When it is desired to use the machine for continuous drilling, we have provided a hook $d'$, Fig. 1, hinged to the runner-frame, which can be made to engage a projection $e'$ on the shaft T when the same is rocked forward to hold the valves $m$ constantly open, and by engaging the dog $r$ with gear W and locking it thereto by a pin passed through the same and perforations $f'$, Fig. 6, in the housing $q$ the shaft N will be continuously turned to operate the dropping mechanism.

Having thus fully described our invention, we claim—

1. In a corn-planter, the combination of the runner-frame carrying seed-dropping mechanism with valves in the spouts, a rotatable feed-shaft therefor, a rock-shaft connected to said valves, a constantly-revolving member on said feed-shaft, a locking member carried by said shaft, and means within reach of the driver's foot for engaging the locking member with the revolving member to actuate the seed-dropping mechanism, substantially as described.

2. In a corn-planter, the combination of the runner-frame carrying seed-dropping mechanism with valves in the spouts, a rotatable feed-shaft therefor, a rock-shaft connected to said valves, a second rock-shaft connected to check-row mechanism, means for coupling said rock-shafts for double action, a constantly-revolving member on said feed-shaft, a locking member carried by said shaft, and means actuated by the check-row mechanism for engaging the locking member with the revolving member, substantially as described.

3. In a corn-planter, the combination of the runner-frame carrying seed-dropping mechanism with valves in the spouts, a rotatable feed-shaft therefor, a rock-shaft connected to said valves, a second rock-shaft connected to check-row mechanism, means for coupling said rock-shafts for double action, a constantly-revolving member on said feed-shaft, a locking member carried by said shaft, means within control of the driver's foot, means actuated by the check-row mechanism, and hand means, any one of which means may be employed for engaging the locking member with the revolving member, substantially as described.

4. In a corn-planter, the combination of the runner-frame carrying seed-dropping mechanism with valves in the spouts, a rotatable feed-shaft therefor, a rock-shaft connected to said valves, a ratchet fast on the feed-shaft and carrying a spring-projected dog, a constantly-revolving wheel with teeth in the path of the nose of said dog, a fixed disk with depressions for receiving said dog when disengaged from the teeth of the wheel, and a dog actuated by the rock-shaft for forcing said first-named dog out of a depression and into engagement with the constantly-revolving wheel, whereby the feed-shaft becomes locked to said wheel, substantially as described.

5. In a corn-planter, the combination of the runner-frame carrying seed-dropping mechanism with valves in the spouts, a rotatable feed-shaft therefor, a rock-shaft connected to check-row mechanism, means for connecting said rock-shafts for double action, a ratchet fast on the feed-shaft, and carrying a spring-projected dog, a fixed disk with depressions for receiving said dog when disengaged from the teeth of the wheel, and a dog actuated by either of said rock-shafts for forcing said first-named dog out of a depression and into engagement with the constantly-revolving wheel, substantially as described.

6. In a corn-planter, the combination of the constantly-revolving crown-wheel, W, mounted on the feed-shaft, N, the ratchet, U, fast on said shaft and carrying the housing, $q$, provided with the spring-projected dog, $r$, the fixed recessed disk, V, the rock-shaft, T, connected to the valves in the seed-spouts and carrying dog, A', to engage the ratchet, the rock-shaft, R, connected to the check-row mechanism by means of crank-arms, $e$, and the link, $h$, for coupling said rock-shafts for double action, substantially as described.

ARTHUR F. BROWN.
CLEMENT W. MICHAEL.

Witnesses:
WARREN HALL,
J. F. CAMPBELL.